H. J. WINN.
LANTERN HOOK.
APPLICATION FILED MAY 16, 1917.

1,255,071.

Patented Jan. 29, 1918.

Witness
John P. Woodworth
Ross J. Woodward

Inventor
Harry John Winn.
By Richard Bowen,
Attorney

UNITED STATES PATENT OFFICE.

HARRY JOHN WINN, OF RIVER FALLS, WISCONSIN.

LANTERN-HOOK.

1,255,071.  Specification of Letters Patent.  Patented Jan. 29, 1918.

Application filed May 16, 1917. Serial No. 169,025.

*To all whom it may concern:*

Be it known that I, HARRY JOHN WINN, a citizen of the United States, residing at River Falls, in the county of Pierce and State of Wisconsin, have invented certain new and useful Improvements in Lantern-Hooks, of which the following is a specification.

This invention relates to an improved lantern suspending device and includes a carrying plate having a hook extending therefrom and having a latch connected with the hook and carrying plate and having its free end portion extending in operative relation to the hook above the hook and adjacent the carrying plate.

Another object of the invention is to so construct this latching strip that it may be removed from the hook and carrying plate when so desired.

Another object of the invention is to so construct this device that the latching strip will be held against transverse movement and thus prevented from accidentally moving out of operative relation to the hook.

This invention is illustrated in the accompanying drawings, wherein:—

Figure 1:
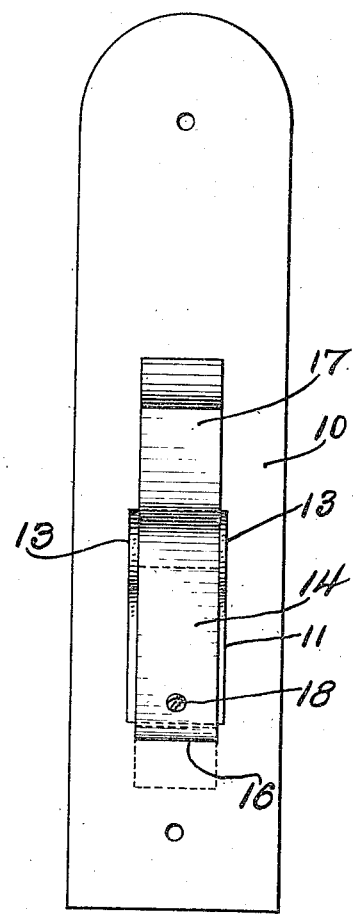
Figure 2:
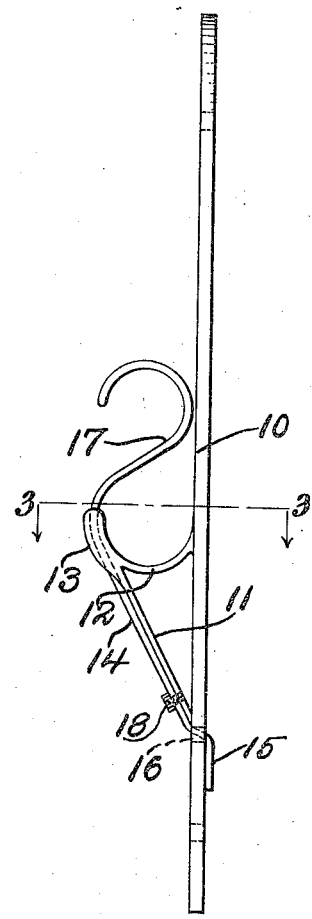
Figure 3:
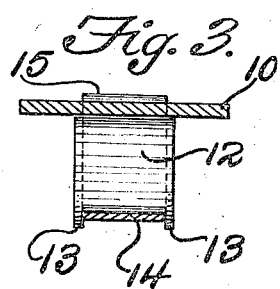

Figure 1 is a view showing the improved lantern suspending device in front elevation, Fig. 2 is a view of the lamp suspending device in side elevation, and Fig. 3 is a transverse sectional view taken along the line 3—3 of Fig. 2.

The suspending device is provided with a body, plate or back-board 10 from which there extends a hook 11 having an upper web 12 leading from the upper end of the hook to the back-board or body 10. This hook may be cast integral with the plate 10 or it may be formed separate from the plate and connected therewith in any suitable manner.

Ribs or flanges 13 extend from the hook and serve as abutments for a purpose to be hereinafter brought out.

The latch or retaining element 14 is formed from a strip of spring metal and fits against the hook 11 with its lower end portion 15 extending through a slot 16 formed in the plate 10 and engaging the inner face of this plate or back-board. The free end portion of this latching strip is bent to provide a bill or arm 17 extending to the position shown in Fig. 2 thus extending over the upper web of the hook and providing means for holding the lantern in engagement with the hook and preventing a lantern from slipping off of the hook. It should be noted that this latching strip extends between the abutments 13 and therefore the strip will be held against transverse movement and cannot slip out of the operative position.

It will thus be seen that when this strip is put in place and secured by the fastener 18, a very efficient and serviceable suspending device for a lamp will be provided. It will be further noted that although the bail of the lantern will be presented from accidentally slipping off of the hook, it will at the same time be very easy to suspend the lantern from the hook or disconnect the lantern from the hook.

What is claimed is:—

1. A lantern suspending device comprising a body, a suspending hook extending from said body and provided with an upper web, the body being provided with a slot beneath the hook, a latching strip secured to the hook and having its lower end portion extending through the slot and having its upper end portion bent to provide a bill extending above the hook and in operative relation to the body, and abutment means extending from the hook upon opposite sides of the latching strip to prevent transverse movement of the latching strip.

2. A lantern suspending device comprising a body provided with a slot, a suspending hook extending from the body above the slot, and a latching strip secured to the hook and having its lower end portion extending through the slot and its upper end portion bent to provide a bill extending above the hook.

In testimony whereof I affix my signature in presence of two witnesses.

HARRY JOHN WINN.

Witnesses:
W. S. DAVIS,
A. E. JENSON.

Copies of this patent may be obtained for five cents each, by addressing the "Commissioner of Patents, Washington, D. C."